(12) United States Patent
Chen

(10) Patent No.: US 9,278,591 B2
(45) Date of Patent: Mar. 8, 2016

(54) FLEXIBLE REINFORCED TIRE VALVE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 100 days.

(21) Appl. No.: 14/301,912

(22) Filed: Jun. 11, 2014

(65) Prior Publication Data

US 2015/0328944 A1 Nov. 19, 2015

(30) Foreign Application Priority Data

May 15, 2014 (TW) .............................. 103117067 A

(51) Int. Cl.
*B60C 29/02* (2006.01)
*B60C 29/06* (2006.01)

(52) U.S. Cl.
CPC ............... *B60C 29/02* (2013.01); *B60C 29/066* (2013.01)

(58) Field of Classification Search
CPC ...... B60C 29/005; B60C 29/02; B60C 29/066
See application file for complete search history.

(56) References Cited

U.S. PATENT DOCUMENTS

| | | | |
|---|---|---|---|
| 3,191,655 A * | 6/1965 | McCord | B60C 5/12 152/427 |
| 4,049,037 A * | 9/1977 | Gale | B60C 29/02 157/427 |
| 6,845,969 B2 * | 1/2005 | Kayukawa | B60C 29/02 137/234.5 |
| 6,966,331 B2 * | 11/2005 | Simmons | B60C 29/02 137/223 |

* cited by examiner

*Primary Examiner* — John Walters
*Assistant Examiner* — James Triggs
(74) *Attorney, Agent, or Firm* — Guice Patents PLLC

(57) ABSTRACT

A flexible reinforced tire valve is disclosed. The flexible reinforced tire valve comprises a tube body, a flexible sleeve and a collar. The flexible sleeve is further disposed with a second blocking edge. When the flexible reinforced tire valve is installed on the wheel rim, the upper edge of the collar presses against the second blocking edge and the lower edge of the collar presses against an outer surface of the wheel rim so as to strengthen the durability of the tire valve against centrifugal force, whereby the tire will not leak even if the vehicle moves at high speed.

20 Claims, 9 Drawing Sheets

# FLEXIBLE REINFORCED TIRE VALVE

BACKGROUND OF THE INVENTION 1. (a) Field of the Invention

The present invention generally relates to a flexible reinforced tire valve, in particular to a tire valve able to prevent from tire leak by enhancing the durability of the tire valve against centrifugal force, whereby the tire will not leak even if the vehicle moves at high speed.

2. (b) Description of the Prior Art

Safe driving is subject to stable tire pressure; therefore, the tire pressure monitor (or device) has become an important accessory for a car. In general, the tire pressure monitor is usually installed on the tire valve of a wheel. In order to achieve weight reduction, the material of tire valve is usually made of aluminum instead of copper. However, in temperature and cold zones, it is inclined to snow in winter; therefore, people will spread salt over roads in order to remove snow from the roads. The tire valve made of aluminum may be eroded by salt, which may result in the aging of the tire valve and tire leak.

The rubber tire valve shown in FIG. 1 is designed to solve the above problem. There is a copper tube 11 inside the tire valve, and the copper tube 11 is covered by a rubber sleeve 12. The rubber sleeve 12 is disposed with the blocking edge 13 for engaging with a wheel rim in order to make sure the inner side of the tire valve fit over the inner surface of the wheel rim. The copper tube 11 is further disposed with the external thread portion 111 for engaging with a corresponding internal thread portion 141 inside the valve cover 14. In addition to the above configuration, the pressure from the tire will further fix the valve cover 14 to prevent from tire leak. Similar devices are disclosed by TW I3344539, TW I388752, etc.

If the vehicle moves at high speed, the aforementioned conventional tire valve will be pressed toward the inside of the wheel by centrifugal force, and the force that the blocking edge 13 engages with the wheel rim and the force from the tire pressure will also be cancelled by centrifugal force, so that the inner surface of the tire valve cannot tightly fit over the inner surface of the wheel rim, which will result in tire leak. Thus, rubber valves are not suitable for vehicles moving at high speed, especially for those moving at the no-speed-limit German freeway.

SUMMARY OF THE INVENTION

Therefore, it is a primary objective of the present invention to provide a flexible reinforced tire valve capable of preventing from tire leak so as to strengthen the durability of the tire valve against centrifugal force, whereby the tire will not leak even if the vehicle moves at high speed.

To achieve the foregoing objective, the first embodiment of the present invention provides a flexible reinforced tire valve. The flexible reinforced tire valve may comprise a tube body, a flexible sleeve and a collar. The flexible sleeve may be hollow, and the tube body may be capped by the flexible sleeve. The outer surface of the flexible sleeve may be further disposed with a second blocking edge, a slot and a clamping part, wherein the slot can be engaged with the wheel rim and the clamping part can press against the inner surface of the wheel rim. The collar can fit tightly around the flexible sleeve when the flexible reinforced tire valve is installed on the wheel rim, wherein the upper edge of the collar can press against the second blocking edge and the lower edge of the collar can press against the outer surface of the wheel rim.

In a preferred embodiment of the present invention, the outer surface of the aforementioned collar may be disposed with a gap.

In a preferred embodiment of the present invention, the upper portion of the aforementioned collar may be further disposed with a plurality of gaps.

In a preferred embodiment of the present invention, the aforementioned flexible reinforced tire valve may further comprise a tire pressure monitoring device connected to the tube body in order to monitor the tire pressure of the vehicle.

In a preferred embodiment of the present invention, the aforementioned flexible reinforced tire valve may further comprise a first blocking edge, wherein the lower edge of the first blocking edge presses against the outer surface of the wheel rim.

In a preferred embodiment of the present invention, the aforementioned flexible reinforced tire valve may further comprise a hard pad, wherein the hard pad fits tightly around the bottom of the tube body, whereby the inside and the outside of the flexible reinforced tire valve are tightly clamped to enhance the firmness of the tire valve.

To achieve the foregoing objective, the second embodiment of the present invention further provides a flexible reinforced tire valve. The flexible reinforced tire valve may comprise a tube body, a flexible sleeve and a collar. The outer surface of the tube body may be disposed with a second blocking edge. The flexible sleeve may be hollow, and the tube body may be capped by the flexible sleeve. The outer surface of the flexible sleeve may be further disposed with a slot and a clamping part, wherein the slot can be engaged with the wheel rim and the clamping part can press against the inner surface of the wheel rim. The collar can fit tightly around the flexible sleeve when the flexible reinforced tire valve is installed on the wheel rim, wherein the upper edge of the collar can press against the second blocking edge and the lower edge of the collar can press against the outer surface of the wheel rim.

In a preferred embodiment of the present invention, the outer surface of the aforementioned collar may be disposed with a gap.

In a preferred embodiment of the present invention, the upper portion of the aforementioned collar may be further disposed with a plurality of gaps.

In a preferred embodiment of the present invention, the aforementioned flexible reinforced tire valve may further comprise a tire pressure monitoring device connected to the tube body in order to monitor the tire pressure of the vehicle.

In a preferred embodiment of the present invention, the aforementioned flexible reinforced tire valve may further comprise a first blocking edge, wherein the lower edge of the first blocking edge presses against the outer surface of the wheel rim.

In a preferred embodiment of the present invention, the aforementioned flexible reinforced tire valve may further comprise a hard pad, wherein the hard pad fits tightly around the bottom of the tube body, whereby the inside and the outside of the flexible reinforced tire valve are tightly clamped to enhance the firmness of the tire valve.

To achieve the foregoing objective, the third embodiment of the present invention further provides a flexible reinforced tire valve. The flexible reinforced tire valve may comprise a tube body, a flexible sleeve, a second blocking edge and a collar. The flexible sleeve may be hollow, and the tube body may be capped by the flexible sleeve. The outer surface of the flexible sleeve may be further disposed with a slot and a clamping part, wherein the slot can be engaged with the wheel rim and the clamping part can press against the inner surface of the wheel rim. The second blocking edge may be installed on the base below the body of a valve cover, and above the flexible sleeve. The collar can fit tightly around the flexible sleeve when the flexible reinforced tire valve is installed on the wheel rim, wherein the upper edge of the collar can press against the second blocking edge and the lower edge of the collar can press against the outer surface of the wheel rim.

In a preferred embodiment of the present invention, the outer surface of the aforementioned collar may be disposed with a gap.

In a preferred embodiment of the present invention, the upper portion of the aforementioned collar may be further disposed with a plurality of gaps.

In a preferred embodiment of the present invention, the aforementioned flexible reinforced tire valve may further comprise a tire pressure monitoring device connected to the tube body in order to monitor the tire pressure of the vehicle.

In a preferred embodiment of the present invention, the aforementioned flexible reinforced tire valve may further comprise a first blocking edge, wherein the lower edge of the first blocking edge presses against the outer surface of the wheel rim.

In a preferred embodiment of the present invention, the aforementioned flexible reinforced tire valve may further comprise a hard pad, wherein the hard pad fits tightly around the bottom of the tube body, whereby the inside and the outside of the flexible reinforced tire valve are tightly clamped to enhance the firmness of the tire valve.

In a preferred embodiment of the present invention, the body of the aforementioned valve cover and the base may be formed integrally, and the second blocking edge may be installed on the bottom of the base.

In a preferred embodiment of the present invention, the body of the aforementioned valve cover and the base may be separated, and the second blocking edge may be installed on a bottom of the base

DETAILED DESCRIPTION OF THE PREFERRED EMBODIMENTS

The technical content of the present invention will become apparent by the detailed description of the following embodiments and the illustration of related drawings as follows.

Figure 1:
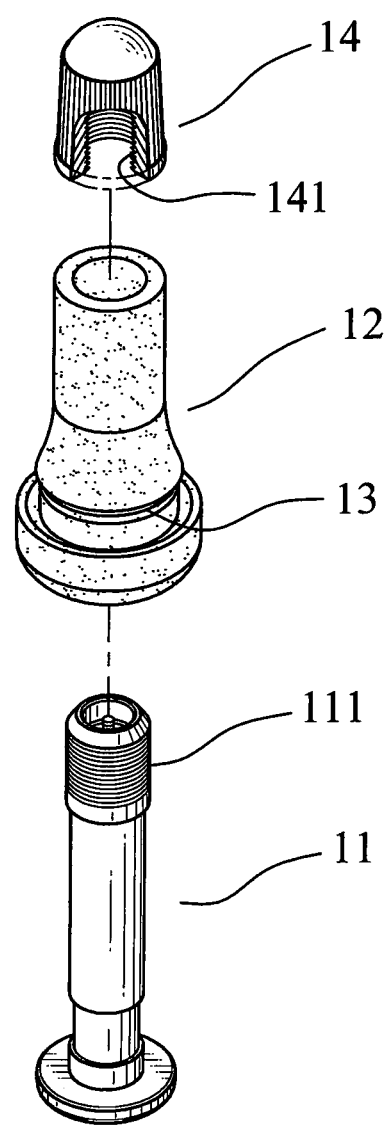
FIG. 1 is a 3D exploded view of a conventional tire valve.
Figure 2:
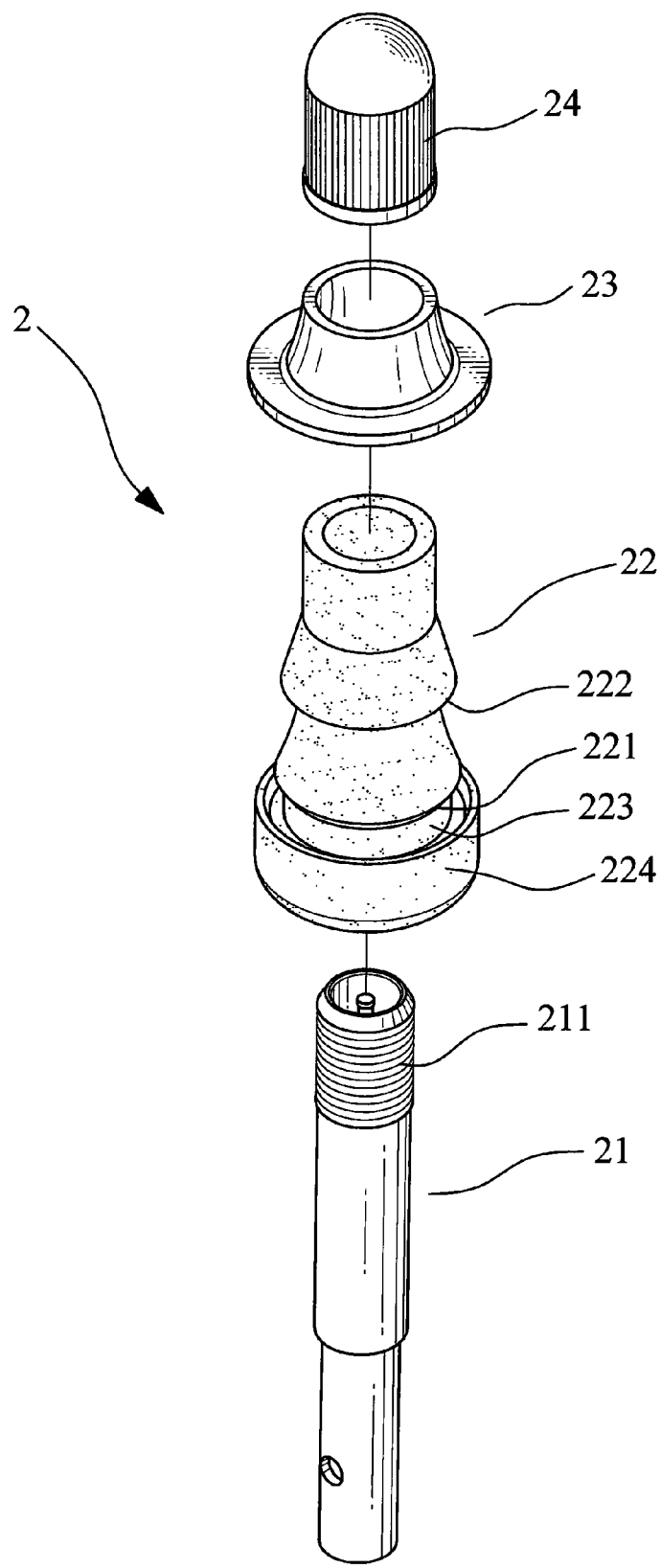
FIG. 2 is a 3D exploded view of the first embodiment in accordance with the present invention.
Figure 3:
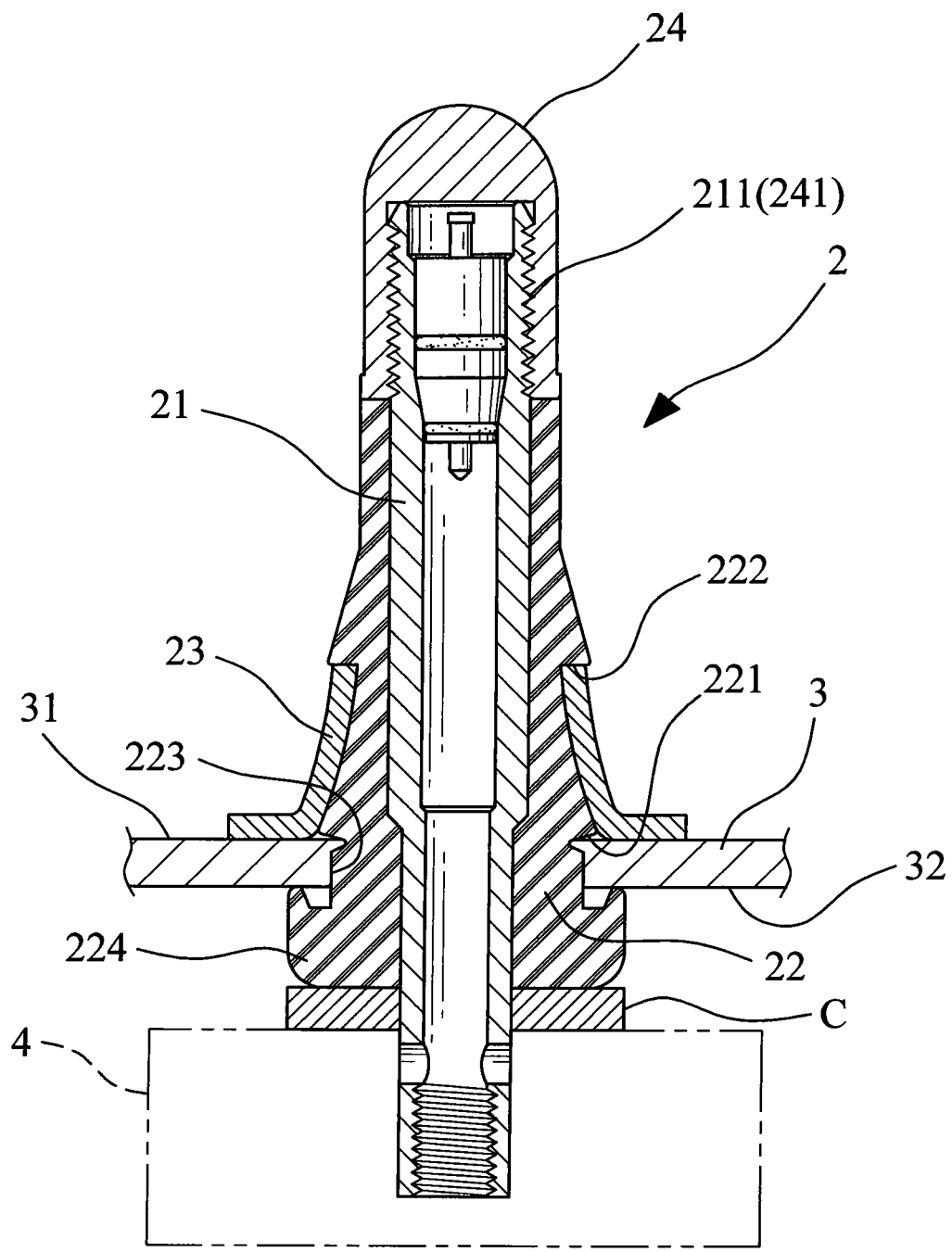
FIG. 3 is a cross-sectional view of the first embodiment in accordance with the present invention.

With reference to FIG. 1 and FIG. 2 for the first embodiment of the flexible reinforced tire valve 2 in accordance with the present invention, the flexible reinforced tire valve 2 comprises a tube body 21, a flexible sleeve 22 and a collar 23. The tube body 21 may be made of metal. The flexible sleeve 22 is hollow, and the tube body 21 is capped by the flexible sleeve 22. The flexible sleeve 22 may be made of rubber, and a second blocking edge 222, a slot 223 and a clamping part 224 are disposed on its outer surface. The slot 223 is engaged with the wheel rim 3 and the upper edge of the clamping part 224 can abut against the inner surface 32 of the wheel rim 3. The collar 23 may be made of metal, plastic and hard material. The collar 23 can fit tightly around the flexible sleeve 22 when the flexible reinforced tire valve 2 is installed on the wheel rim 3. The upper edge of the collar 23 can press against the second blocking edge 222 and the lower edge of the collar 23 can press against the outer surface 31 of the wheel rim 3.

Figure 9:
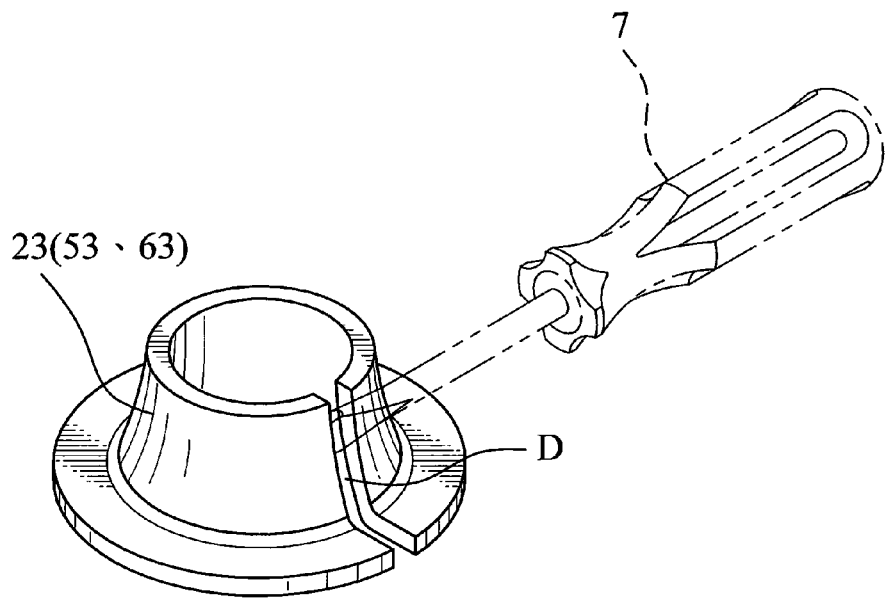
FIG. 9 is a schematic view (1) of the disassembly of a collar in accordance with the present invention.

As shown in FIG. 9, the outer surface of the collar 23 can be further disposed with a gap D in order to disassemble the flexible reinforced tire valve 2 more convenient. When disassembling the flexible reinforced tire valve 2, the user can insert a flathead screwdriver 7 into the gap D to pull open the upper portion of the collar 23 to easily remove the collar 23.

Figure 10:
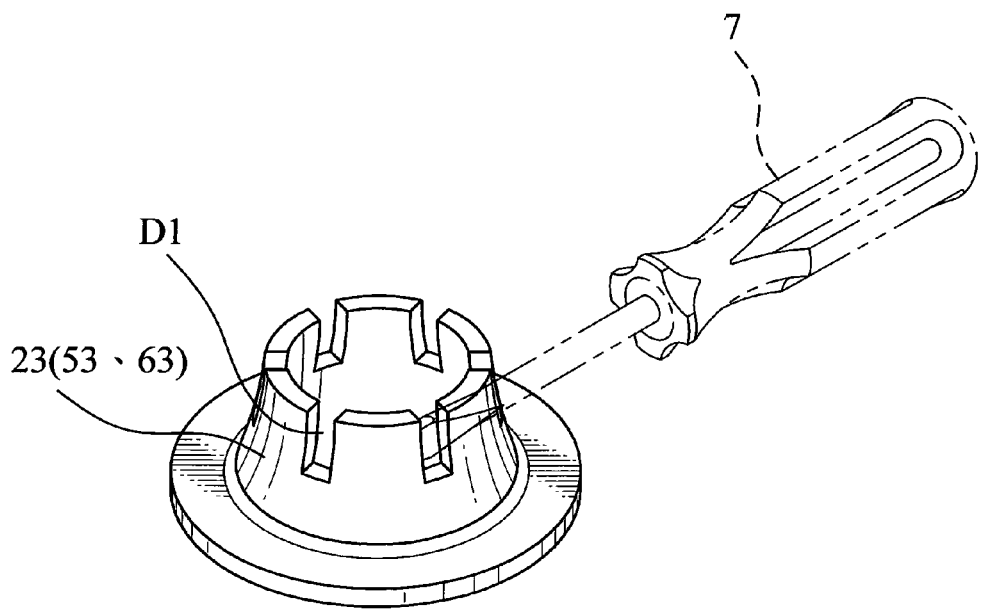
FIG. 10 is a schematic view (2) of the disassembly of a collar in accordance with the present invention.

As shown in FIG. 10, the upper portion of the collar 23 can be further disposed with a plurality of gaps D1. When disassembling the flexible reinforced tire valve 2, the user can insert a flathead screwdriver 7 into the gap D1 to pull open the upper portion of the collar 23 to easily remove the collar 23.

The flexible reinforced tire valve 2 can further comprise a tire pressure monitoring device 4. The tire pressure monitoring device 4 can be connected to the tube body 21 for monitoring the tire pressure of the vehicle.

The flexible reinforced tire valve 2 can further comprise a first blocking edge 221. The lower edge of the first blocking edge 221 can press against the outer surface 31 of the wheel rim 3.

The flexible reinforced tire valve 2 can further comprise a hard pad C. The hard pad C can fit tightly around the bottom of the tube body 21, whereby the inside and the outside of the flexible reinforced tire valve 2 are tightly clamped in order to further fix the flexible reinforced tire valve 2.

The upper of the tube body 21 can be further disposed with an external thread portion 211 for engaging with a corresponding internal thread portion 241 of the valve cover 24.

Figure 4:
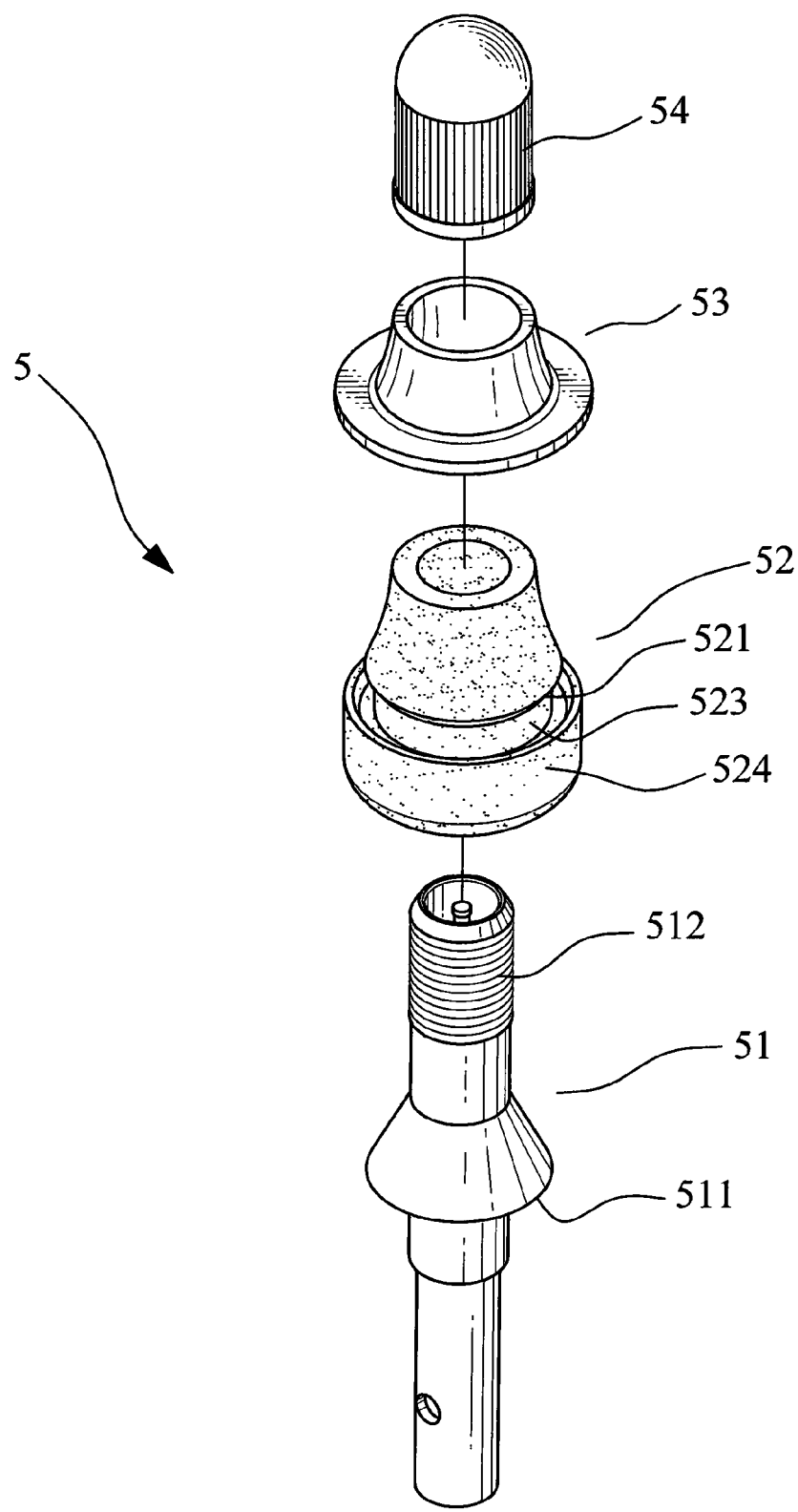
FIG. 4 is a 3D exploded view of the second embodiment in accordance with the present invention.
Figure 5:
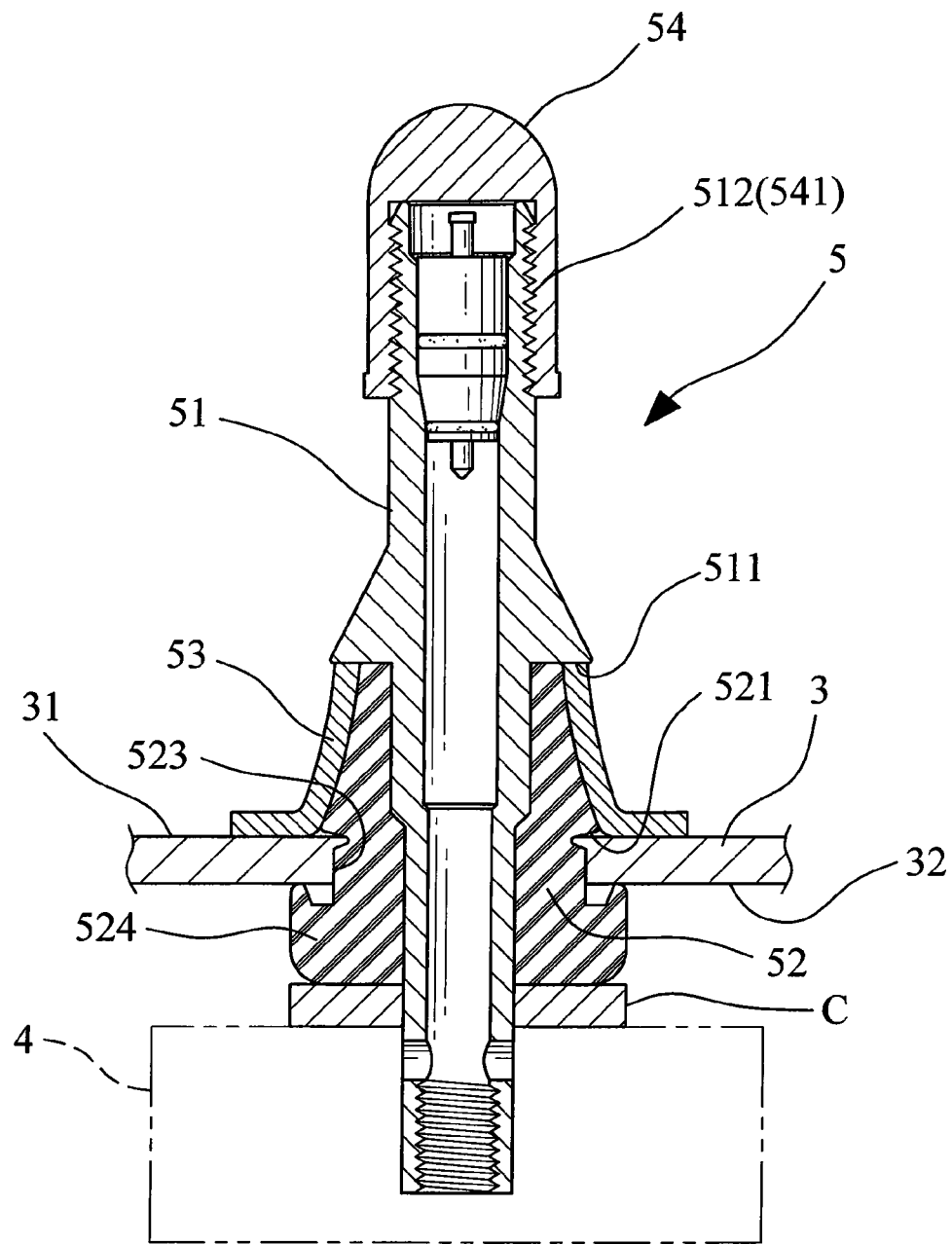
FIG. 5 is a cross-sectional view of the second embodiment in accordance with the present invention.

With reference to FIG. 4 and FIG. 5 for the second embodiment of the flexible reinforced tire valve 5 in accordance with the present invention, the flexible reinforced tire valve 5 comprises a tube body 51, a flexible sleeve 52 and a collar 53. The tube body 51 may be made of metal, and the outer surface of the tube body 51 is disposed with the second blocking edge 511. The flexible sleeve 52 can be hollow, and the tube body 21 is capped by the flexible sleeve 52. The flexible sleeve 52 may be made of rubber, and a slot 523 and a clamping part 524 are disposed on its outer surface. The slot 523 is engaged with the wheel rim 3 and the upper edge of the clamping part 524 can press against the inner surface 32 of the wheel rim 3. The collar 53 may be made of metal, plastic and hard material. The collar 53 can fit tightly around the flexible sleeve 52 when the flexible reinforced tire valve 5 is installed on the wheel rim 3. The upper edge of the collar 53 can press against the second blocking edge 511 and the lower edge of the collar 53 can press against the outer surface 31 of the wheel rim 3.

As shown in FIG. 9, the outer surface of the collar 53 can be further disposed with a gap D in order to disassemble the flexible reinforced tire valve 5 more convenient. When disassembling the flexible reinforced tire valve 5, the user can insert a flathead screwdriver 7 into the gap D to pull open the upper portion of the collar 53 to easily remove the collar 53.

As shown in FIG. 10, the upper portion of the collar 53 can be further disposed with a plurality of gaps D1. When disassembling the flexible reinforced tire valve 5, the user can insert a flathead screwdriver 7 into the gap D1 to pull open the upper portion of the collar 53 to easily remove the collar 53.

The flexible reinforced tire valve 5 can further comprise a tire pressure monitoring device 4. The tire pressure monitoring device 4 can be connected to the tube body 51 for monitoring the tire pressure of the vehicle.

The flexible reinforced tire valve 5 can further comprise a first blocking edge 521. The lower edge of the first blocking edge 521 can press against the outer surface 31 of the wheel rim 3.

The flexible reinforced tire valve 5 can further comprise a hard pad C. The hard pad C can fit tightly around the bottom of the tube body 51, whereby the inside and the outside of the flexible reinforced tire valve 5 are tightly clamped in order to further fix the flexible reinforced tire valve 5.

The upper of the tube body 51 can be further disposed with an external thread portion 511 for engaging with the corresponding internal thread portion 541 inside the valve cover 54.

Figure 6:
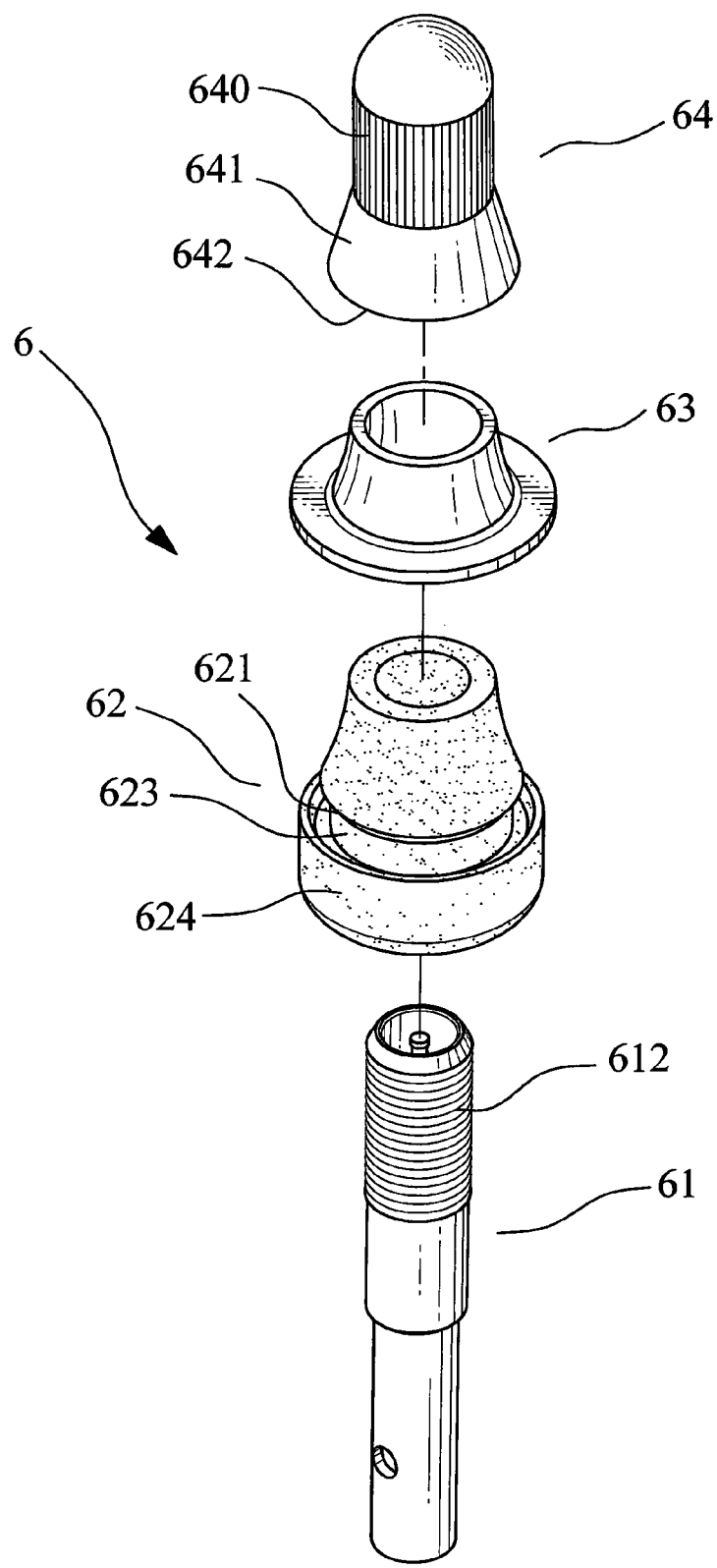
FIG. 6 is a 3D exploded view of the third embodiment in accordance with the present invention.
Figure 7:
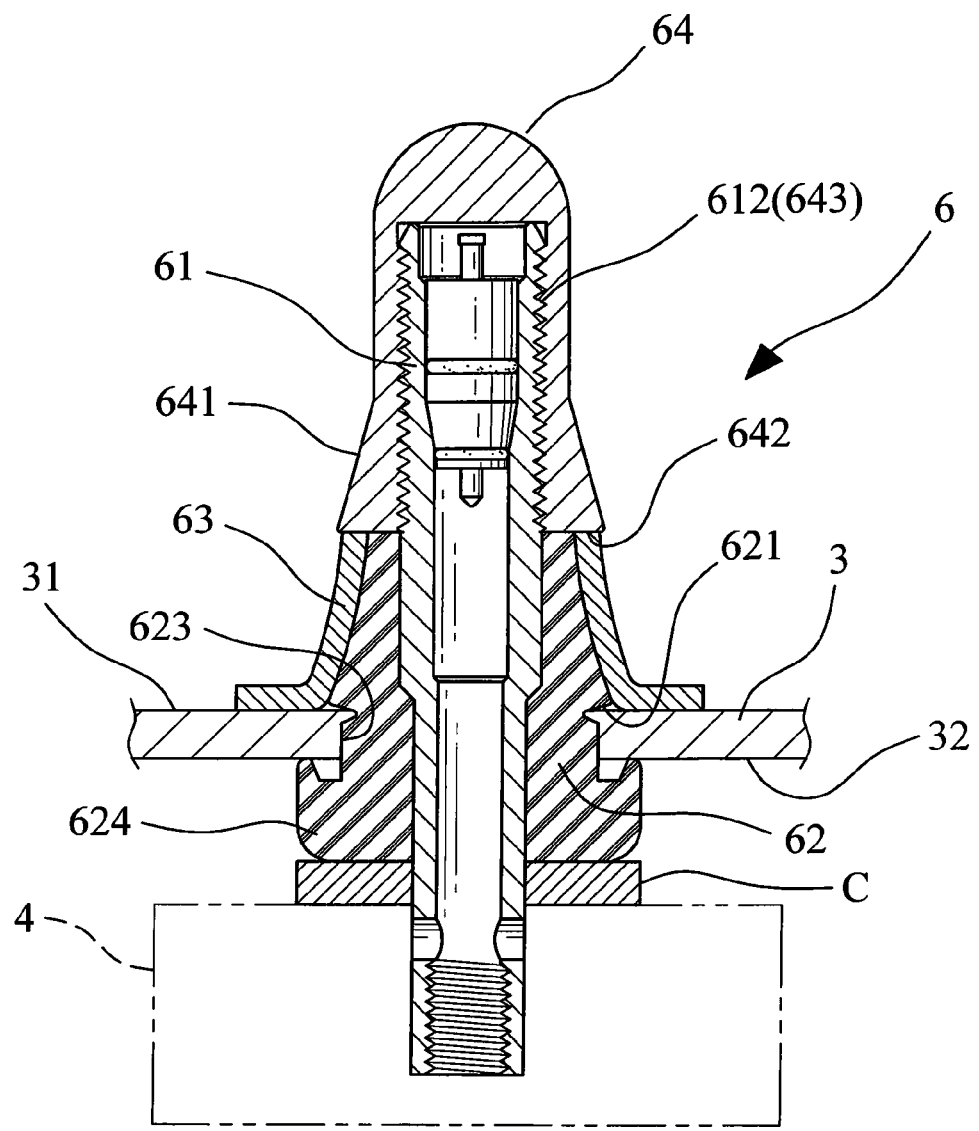
FIG. 7 is a cross-sectional view (1) of the first embodiment in accordance with the present invention.

With reference to FIG. 6 and FIG. 7 for the third embodiment of the flexible reinforced tire valve 6 in accordance with the present invention, the flexible reinforced tire valve 6 comprises a tube body 61, a flexible sleeve 62, a second blocking edge 642 and a collar 63. The tube body 61 may be made of metal.

The flexible sleeve 62 can be hollow, and the tube body 61 is capped by the flexible sleeve 62. The flexible sleeve 62 may be made of rubber, and a slot 623 and a clamping part 624 are disposed on its outer surface. The slot 623 is engaged with the wheel rim 3 and the upper edge of the clamping part 624 can press against the inner surface 32 of the wheel rim 3. The second blocking edge 642 is disposed on a base 641 below the body 640 of the valve cover 64, and above the flexible sleeve 62. The collar 63 may be made of metal, plastic and hard material. The collar 63 can fit tightly around the flexible sleeve 62 when the flexible reinforced tire valve 6 is installed on the wheel rim 3. The upper edge of the collar 63 can press against the second blocking edge 642 and the lower edge of the collar 63 can press against the outer surface 31 of the wheel rim 3.

As shown in FIG. 9, the outer surface of the collar 63 can be further disposed with a gap D in order to disassemble the flexible reinforced tire valve 6 more convenient. When disassembling the flexible reinforced tire valve 6, the user can insert a flathead screwdriver 7 into the gap D to pull open the upper portion of the collar 63 to easily remove the collar 63.

As shown in FIG. 10, the upper portion of the collar 63 can be further disposed with a plurality of gaps D1. When disassembling the flexible reinforced tire valve 6, the user can insert a flathead screwdriver 7 into the gap D1 to pull open the upper portion of the collar 63 to easily remove the collar 63.

The flexible reinforced tire valve 6 can further comprise a tire pressure monitoring device 4. The tire pressure monitoring device 4 can be connected to the tube body 61 for monitoring the tire pressure of the vehicle.

The flexible sleeve 62 can further comprise a first blocking edge 621. The lower edge of the first blocking edge 621 can press against the outer surface 31 of the wheel rim 3.

The flexible reinforced tire valve 6 can further comprise a hard pad C. The hard pad C can fit tightly around the bottom of the tube body 61, whereby the inside and the outside of the flexible reinforced tire valve 6 are tightly clamped in order to further fix the flexible reinforced tire valve 6.

The upper of the tube body 61 can be further disposed with an external thread portion 612 for engaging with a corresponding internal thread portion 643 inside the valve cover 64.

The body 640 of the valve cover 64 and the base 641 are formed integrally, and the second blocking edge 642 is at the bottom of the base 641 (as shown in FIG. 7).

Figure 8:
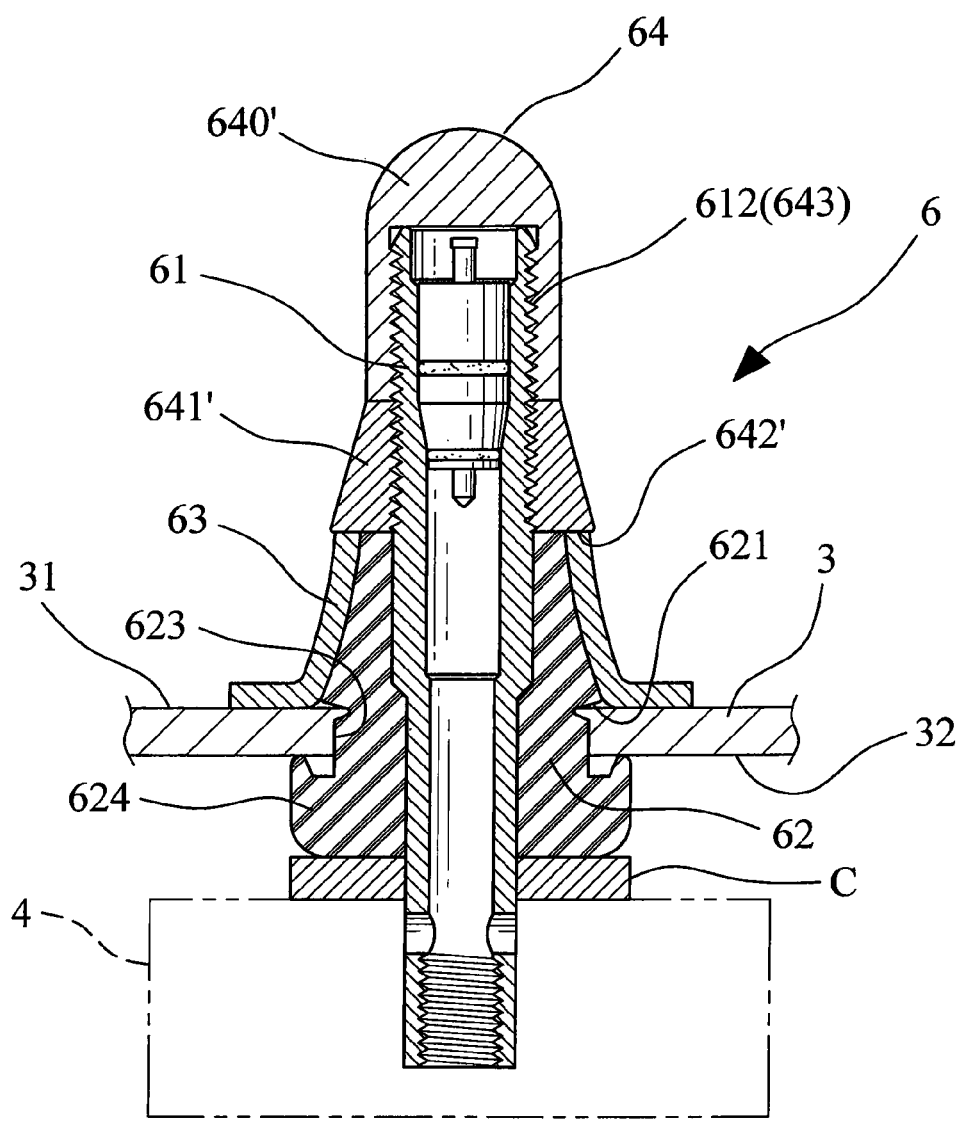
FIG. 8 is a cross-sectional view (2) of the first embodiment in accordance with the present invention.

Another embodiment according to the present invention is shown in FIG. 8. As shown in FIG. 8, the body 640' of the valve cover 64 and the base 641' are separated, and the second blocking edge 642' is at the bottom of the base 641'.

In summation of the description above, the structure of the flexible reinforced tire valve according to the present invention uses the lower edge of the first blocking edge to press against the outer surface of the wheel rim and uses the upper edge of the clamping part of the flexible sleeve to press against the inner surface of the wheel rim. When the tire valve is installed on the wheel rim, the upper edge of the collar can press against the second blocking edge and its lower edge can press against the outer surface of the wheel rim. Therefore, the durability of the rubber tire valve against centrifugal force can be further enhanced, so that the tire will not leak even if the vehicle moves at high speed.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A flexible reinforced tire valve, comprising:
  a tube body;
  a flexible sleeve, wherein the flexible sleeve is hollow, and the tube body is capped by the flexible sleeve; an outer surface of the flexible sleeve is disposed with a second blocking edge, a slot and a clamping part, wherein the slot is engaged with a wheel rim and an upper edge of the clamping part presses against an inner surface of the wheel rim; and
  a collar, for fitting tightly around the flexible sleeve when the flexible reinforced tire valve installed on the wheel rim, wherein an upper edge of the collar presses against the second blocking edge and a lower edge of the collar presses against an outer surface of the wheel rim.

2. The flexible reinforced tire valve of claim 1, wherein an outer surface of the collar is disposed with a gap.

3. The flexible reinforced tire valve of claim 1, wherein an upper portion of the collar is disposed with a plurality of gaps.

4. The flexible reinforced tire valve of claim 1, further comprising a tire pressure monitoring device connected to the tube body in order to monitor a tire pressure of a vehicle.

5. The flexible reinforced tire valve of claim 1, further comprising a first blocking edge, wherein a lower edge of the first blocking edge presses against the outer surface of the wheel rim.

6. The flexible reinforced tire valve of claim 1, further comprising a hard pad, wherein the hard pad fits tightly around a bottom of the tube body, whereby an inside and an outside of the flexible reinforced tire valve are tightly clamped to enhance a firmness of the flexible reinforced tire valve.

7. A flexible reinforced tire valve, comprising:
  a tube body, wherein an outer surface of the tube body is disposed with a second blocking edge;
  a flexible sleeve, wherein the flexible sleeve is hollow, and the tube body is capped by the flexible sleeve; an outer surface of the flexible sleeve is disposed with a slot and a clamping part, wherein the slot is engaged with a wheel rim and an upper edge of the clamping part presses against an inner surface of the wheel rim; and a collar, for fitting tightly around the flexible sleeve when the flexible reinforced tire valve installed on the wheel rim, wherein an upper edge of the collar presses against the second blocking edge and a lower edge of the collar presses against an outer surface of the wheel rim.

8. The flexible reinforced tire valve of claim 7, wherein an outer surface of the collar is disposed with a gap.

9. The flexible reinforced tire valve of claim 7, wherein an upper portion of the collar is disposed with a plurality of gaps.

10. The flexible reinforced tire valve of claim 7, further comprising a tire pressure monitoring device connected to the tube body in order to monitor a tire pressure of a vehicle.

11. The flexible reinforced tire valve of claim 7, further comprising a first blocking edge, wherein a lower edge of the first blocking edge presses against the outer surface of the wheel rim.

12. The flexible reinforced tire valve of claim 7, further comprising a hard pad, wherein the hard pad fits tightly around a bottom of the tube body, whereby an inside and an outside of the flexible reinforced tire valve are tightly clamped to enhance a firmness of the flexible reinforced tire valve.

13. A flexible reinforced tire valve, comprising:
a tube body;
a flexible sleeve, wherein the flexible sleeve is hollow, and the tube body is capped by the flexible sleeve; an outer surface of the flexible sleeve is disposed with a slot and a clamping part, wherein the slot is engaged with a wheel rim and an upper edge of the clamping part presses against an inner surface of the wheel rim;

a second blocking edge, installed on a base below a body of a valve cover, and above the flexible sleeve; and a collar, for fitting tightly around the flexible sleeve when the flexible reinforced tire valve installed on the wheel rim, wherein an upper edge of the collar presses against the second blocking edge and a lower edge of the collar presses against an outer surface of the wheel rim.

14. The flexible reinforced tire valve of claim 13, wherein an outer surface of the collar is disposed with a gap.

15. The flexible reinforced tire valve of claim 13, wherein an upper portion of the collar is disposed with a plurality of gaps.

16. The flexible reinforced tire valve of claim 13, further comprising a tire pressure monitoring device connected to the tube body in order to monitor a tire pressure of a vehicle.

17. The flexible reinforced tire valve of claim 13, further comprising a first blocking edge, wherein a lower edge of the first blocking edge presses against the outer surface of the wheel rim.

18. The flexible reinforced tire valve of claim 13, further comprising a hard pad, wherein the hard pad fits tightly around a bottom of the tube body, whereby an inside and an outside of the flexible reinforced tire valve are tightly clamped to enhance a firmness of the flexible reinforced tire valve.

19. The flexible reinforced tire valve of claim 13, wherein the body of the valve cover and the base are formed integrally, and the second blocking edge is at a bottom of the base.

20. The flexible reinforced tire valve of claim 13, wherein the body of the valve cover and the base are separated, and the second blocking edge is at a bottom of the base.

* * * * *